June 9, 1970 T. L. BARKER Re. 26,906
CENTERING AND LIFTING MEANS FOR AN AUTOMATIC CASE LOADER
Original Filed June 20, 1966 2 Sheets-Sheet 1
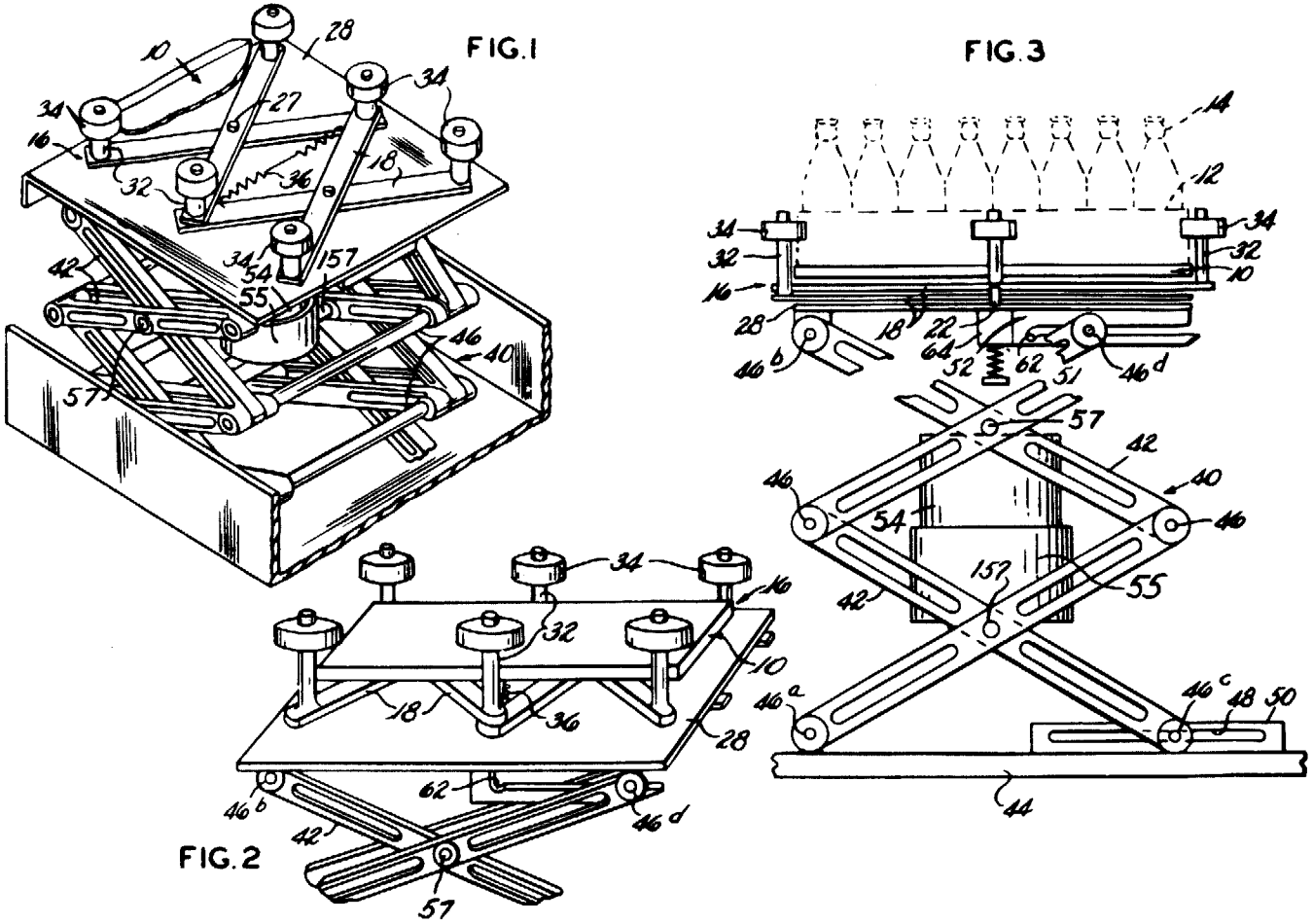
INVENTOR.
Theodore L. Barker
BY
Oldham & Oldham
Attys

CENTERING AND LIFTING MEANS FOR AN AUTOMATIC CASE LOADER

Original Filed June 20, 1966 2 Sheets-Sheet 2

INVENTOR.
Theodore L. Barker
BY Oldham & Oldham
Attys

United States Patent Office

Re. 26,906
Reissued June 9, 1970

26,906

CENTERING AND LIFTING MEANS FOR AN AUTOMATIC CASE LOADER

Theodore L. Barker, Parma, Ohio, by Automatic Sprinkler Corporation of America, Cleveland, Ohio, a corporation of Ohio, assignee Original No. 3,412,873, dated Nov. 26, 1968, Ser. No. 558,978, June 20, 1966. Application for reissue Apr. 14, 1969, Ser. No. 824,007
Int. Cl. B65g *69/00*
U.S. Cl. 214—1 7 Claims

Matter enclosed in heavy brackets [ ] appears in the original patent but forms no part of this reissue specification; matter printed in italics indicates the additions made bv reissue.

ABSTRACT OF THE DISCLOSURE

Apparatus for centering cases to be loaded with containers and including a support means, a tray mounted above the support means, and an expansible frame means which is substantially flat and is operatively positioned between the support means and the tray. Guide members are secured to the frame means and extend upwardly therefrom at the sides of and extending above the tray. Spring means bias portions of the frame means towards each other but adapt the post members to operatively engage a case on the tray and center it thereon. A pantographic lifting frame means secures the plate means to a base and fluid actuated piston means engage the pantographic lifting frame means to control movement thereof.

This invention relates to means for centering and/or lifting empty cases which are to be filled with bottles of beverages or other articles, and, particularly, to pantographic lifting frame means which are utilized to obtain a mechanical distance advantage in the raising of the empty cases so that they may be filled with bottled beverages. The apparatus of the invention also contemplates utilizing pantographic centering frame means which are operatively positioned on the case lifting apparatus so that the empty cases will be centered in proper position to facilitate loading the cases with bottled or canned beverages or other articles.

It is the general object of the present invention to provide apparatus which efficiently, effectively, quickly, and automatically lifts and prepares for loading empty cases adapted to receive articles therein. Pantographic lifting frame means are provided to obtain a mechanical distance advantage in the raising and lowering of the cases to be loaded, and pantographic centering frame means are provided to center the empty cases received in consecutive fashion on the case loading apparatus.

In the drawings:

FIG. 1 is a perspective view, partially broken away, particularly illustrating a preferred embodiment of the apparatus of the invention;

FIG. 2 is a perspective view, partially broken away, similar to FIG. 1, particularly illustrating the pantographic case centering apparatus of the invention;

FIG. 3 is a side elevation, partially broken away, of the apparatus illustrated in FIGS. 1 and 2;

Figure 5:
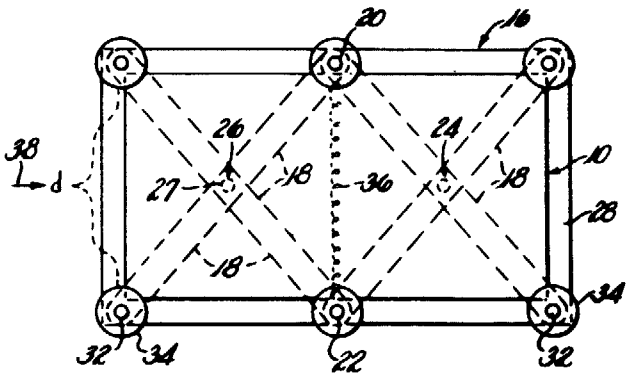
FIG. 5 is a plan view, particularly illustrating the pantographic case centering apparatus of the invention.

In the drawings, the numeral 10 generally indicates a substantially flat tray, or plate which is adapted to have slid thereon an empty case 12, indicated in dotted lines. In the actual operation of the apparatus of the invention, some suitable conveyor means (not shown), consecutively conveys a plurality of empty cases 12 whereby each case is independently pushed onto the tray 10 as selectively desired.

Since the empty case 12 should be positioned so that a plurality of articles, such as bottles 14, also indicated in dotted lines, can be readily deposited into the case 12, it greatly facilitates the case loading process to provide apparatus which accurately and centrally positions each empty case 12 consecutively slid onto tray 10. For this purpose, a pantographic frame, indicated generally by the numeral 16, is provided.

The pantographic frame 16 basically consists of four rigid bars 18 which are pivotally connected to each other in order to assume a substantial parallelogram form adapted for pantographing. The bars or legs 18 are pivotally connected to each other at points 20, 22, 24 and 26, as best illustrated by FIG. 5. Pivot pins 27, best illustrated by FIGS. 1 and 4, which pivotally and/or slidably connect at points 24 and 26, also pivotally mount the entire pantographic frame formed by the legs 18 on a suitable support means or plate 28 *by one pivot pin 27 being secured to the plate 28*. The plate 28 is substantially rectangular in shape, and is slightly larger than the tray 10. Suitable bolt means 30, best illustrated by FIG. 4, mount the tray 10 in spaced relationship on the plate 28, with the bars 18 which form the pantographic frame 16 extending between the tray 10 and the plate 28.

A plurality of post members 32, are secured to the ends of the bars 18, with the post members 32 being mounted substantially perpendicular to the bars 18 as illustrated by FIGS. 1 and 2. Rotatably mounted on each post member 32 is a suitable rubber bumper 34, the purpose of such bumpers 34 becoming evident as the description proceeds. Extending between pivotal points 20 and 22 of the pantographic frame towards each other.

In the actual operation of the case loading apparatus of the invention, as explained hereinbefore, an empty case 12 will be slid onto the tray 10 in the direction of arrow 38 to FIG. 5 by any suitable mechanism. The distance *d* between the bumpers 34, under normal operating conditions, will be smaller than the width of the empty case 12. Due to the pivotal action of pantographic frame 16, as is well known, once the sides of the case 12 strike the bumpers 34, any expansion or contraction of the pantographic frame 16 caused by pivotal movement of the legs 18 about one fixed pivot pin 27 will be uniform, with the post members 32 and the bumpers 34 always remaining in parallel relation to each other. Thus, as the empty case 12 slides onto the tray 10, it will always be centered on the tray 10 due to the action of the pantographic frame 16. It should be realized that as the case 12 enters onto the tray 10 by pushing apart the bumpers 34 situated on the posts 32, the force of the spring 36 tends to pull pivotal points 20 and 22 towards each other, thereby insuring that the bumpers 34 will hold the case in substantially firm and fixed centered relation on the tray 10.

After the case 12 has been centrally positioned onto the tray 10, and is held firmly thereon by the action of the bumpers 34, the entire tray 10 and plate 28 are lifted so that the case 12 can be raised to a position where bottles 14 can be dropped into the case. Of course, it should be realized that it is not absolutely necessary to provide means wherein the tray 10 and the plate 28 can be lifted to raise the case 12, but it has been found that the most efficient bottling and case loading assembly occurs when the cases are lifted in order to permit a plurality of bottles 14 to be dropped therein from a suitable assembly station located directly above, all as well known in the art. Thus, the case 12 has been accurately located with relation to the assembly station.

The case lifting mechanism utilized in a preferred embodiment of the apparatus of the invention also operates with a type of lazy tong, or pantographic linkage. Pantographic lifting frame means 40, best illustrated by FIGS. 1, 3 and 4, consists of a plurality of rigid bars 42 which also are pivotally connected in parallelogram form. The bottom of the pantographic lifting frame 40 is slidably secured to a suitable base 44 while the top portion of the frame means is slidably secured to the plate 28. A plurality of transversely extending bars 46 join the two sides of the pantographic lifting frame 40, in the manner best illustrated by FIG. 1. As is best illustrated by FIG. 3, bar 46a is fixedly secured to the base 44 and bar 46b is fixedly secured to the plate 28, respectively. Bar 46c is adapted to be slidably received in slot 48 formed in flange 50 secured to the base 44 and bar 46d is adapted to be slidably received in slot 51 positioned in flange 52 secured to the plate 28. The purpose of the slots 48 and 51 in flanges 50 and 52, respectively, is to permit the bars 46c and 46d to slide inwardly as the pantographic lifting frame 40 is raised, as will be explained hereinafter.

Figure 4:
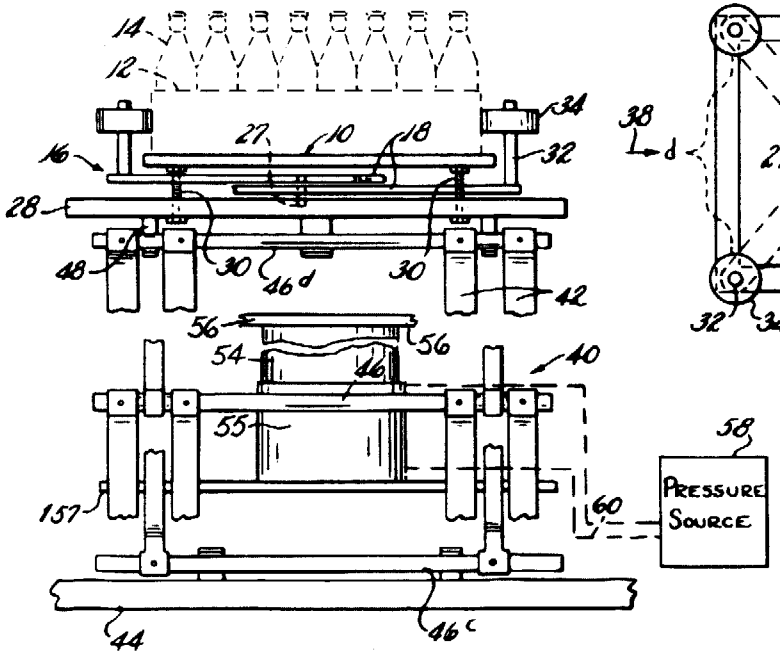
FIG. 4 is an end elevation, partially broken away, of the apparatus illustrated in FIGS. 1, 2 and 3.

As best illustrated by FIGS. 1, 3 and 4, a suitable double acting fluid actuated piston 54 is provided, the piston 54 being slidably mounted in a hollow post, *or cylinder* 55 *the bottom of which is secured to a lower cross bar 157 positioned on and extending between the lower crossed or pivotal connections of the opposed sets of bars 42.* [secured to the base 44.] The piston 54 has integral ears 56 which are affixed at *pivotal* points 57 to the legs 42 of the pantographic lifting frame. A suitable pressure source 58 is provided and fluid pressure line 60 (shown diagrammatically) transmits the pressure to the hollow post 55. Thus, as can be readily understood, when fluid pressure is transmitted to the hollow post 55, the piston 54 will move upwardly and the entire pantographic lifting frame 40 will be raised since piston 54 is connected at points 57 to the legs 42 of the pantographic lifting frame 40.

As the lifting action occurs, bar 46c slidably positioned in slot 48 in flange 50 will move inwardly towards the center of the pantographic lifting frame, and due to the pivotal action of the pantographic frame, the lifting force will be transmitted to the plate 28, with bar 46d sliding in slot 51 in flange 52 secured to plate 28. As can be readily understood, the advantage of the pantographic lifting frame is that a mechanical distance advantage being in this specific instance about three to one is achieved. In other words, the piston 54 is moved only about ⅓ the distance in an upward direction that the plate 28 is raised. Thus, the apparatus provided enables the case 12 to be raised a considerable distance rapidly with a short stroke required by the piston to effect such a lifting action.

In order to insure that the frame 40 always lifts to the same height, when the pantographic lifting frame 40 has raised to almost its full height, bar 46d positioned in slot 51 in flange 52, will slide inwardly until it falls into a notch 62 cut in the flange 52. When the bar 46d falls into the notch 62, it indicates that the top plate 28 is at the desired height and the pantographic lifting frame 40 can be easily held in such a position in order to permit bottles 14 to be dropped accurately into a case 12 positioned on and secured to the tray 10.

When the desired loading of the case 12 has occurred, a force can be imparted to the lifting frame 40 by the piston 54 and post or cylinder 55 and associated means which will remove the bar 46d from notch 62 wherein the entire lifting frame 40 begins to move down into a collapsed position. As such occurs, bars 46c and 46d will slide outwardly in slots 48 and 51, respectively, and a shock absorber means 64 mounted on the plate 28 in suitable fashion prevents the pantographic lifting frame 40 from bottoming at too great a rate whereby some of the bottles 14 positioned in the case 12 could possibly be damaged. After the pantographic lifting frame 40 has collapsed, the loaded case 12 will be pushed out of the tray 10 by an incoming empty case 12, or by other suitable means, and the cycle will repeat itself in the same manner as hereinbefore described.

From the foregoing it is seen that a novel and improved centering and/or lifting apparatus has been provided and that the objects of the invention has been achieved.

While a certain representative embodiment and details have been shown for the purpose of illustrating the invention, it will be apparent to those skilled in this art that various changes and modifications may be made therein without departing from the spirit or scope of the invention.

What is claimed is:

1. Apparatus for loading cases, or other carriers with bottles, or other articles including plate means adapted to receive an empty case in association therewith, expansible link means movable mounted on top of said plate means for movement in a horizontal plane, a tray mounted on said plate means in spaced parallel relation above the plate and the link means to receive a case thereon, a plurality of post members mounted on said link means, and extending perpendicular to the plane thereof, said post members being mounted on end portions of the members of said link means and clearing the sides of and extending above said tray, roller means mounted on each of said post members, spring means biasing the ends of said link means inwardly toward each other, but wherein an empty case is slid onto said tray, portions of the link means are pushed apart by the case which is engaged by the roller means mounted on said post members, said link means acting to center the case received by said tray, base means, collapsible, pantographic lifting frame means adjustably connecting said plate means to said base means in spaced vertical relation thereto, and fluid actuated piston means operatively secured to near the bottom of said pantographic lifting frame means whereby an upward substantially vertical movement of such piston means a given distance will result in a greater upward vertical movement of said plate means.

2. Apparatus for automatically centering empty cases to be loaded with containers including, a support means, a tray mounted in spaced relationship on and above said support means, said tray being adapted to receive an empty case which is slid thereon, expansible frame means which are substantially flat and are operatively positioned between said support means and said tray, a plurality of post members mounted to said frame means, and extending perpendicular to the plane thereof, said post members being mounted to end portions of members forming said frame means and clearing the sides of and extending above said tray, roller means mounted on each of said post members, spring means tending to force the end portions of said frame means toward each other, but wherein when an empty case is slid onto said tray, end portions of the frame means are pushed apart by the case which is engaged by the roller means mounted on said post members, the action of said frame means acting to center the case received by said tray.

3. Apparatus according to claim 2 including a base, collapsible, pantographic lifting frame means adjustably connecting said plate to said base, and power means adapted to raise said pantographic lifting frame means whereby increased ratio distance advantage in raising said plate is achieved.

4. Apparatus for loading cases, or other carriers with bottles, or other articles including plate means adapted to receive an empty case in operative association therewith, means mounted on said plate means to position said cases accurately relative to the plate means, and comprising link means pivotally mounted on top of said plate means for movement in a horizontal plane and being biased towards a collapsed position, a tray smaller in width than a said case mounted on said plate means in spaced parallel relation above the plate and the link means to receive a case thereon, and a plurality of post members mounted on said link means and extending perpendicular to the plane thereof, said post members being mounted on end portions of said link means and extending above said tray on both sides thereof for case engaging and centering action, base means, collapsible, pantographic lifting frame means adjustably connecting said plate means to said base means in spaced vertical relation thereto, and fluid actuated piston means operatively secured to near the bottom of said pantographic lifting frame means whereby an upward vertical movement of such piston means a given distance results in a greater upward vertical movement of said plate means.

5. Apparatus according to claim 4 wherein flange means mounted on said plate means and said base means have horizontally extending slots therein, said slots being adapted to slidably receive end portions of said pantographic frame means whereby actuation of the piston means causes the pantographic frame means to raise said plate means secured thereto, end portions of said frame means sliding in said slots as such raising action occurs.

6. Apparatus according to claim 4 wherein shock absorber means depend from said plate means, said shock absorber means preventing said plate means from bottoming at too rapid a rate when said frame means is collapsed by said fluid actuated piston means.

7. Apparatus as in claim 4 where said pantographic frame means include *at least* a pair of superimposed X-shaped units, the components of each of said units being pivotally secured together and the bottom of the upper unit being pivotally secured to the top of the lower unit, said piston means being secured to *and extending between* the [lower] units at the pivotal joints between the cross members thereof.

References Cited

The following references, cited by the Examiner, are of record in the patented file of this patent or the original patent.

UNITED STATES PATENTS

| | | | |
|---|---|---|---|
| 226,981 | 4/1880 | Conover | 187—18 |
| 718,543 | 1/1903 | Starks | 214—16.4 |
| 2,661,100 | 12/1953 | Ashford | 214—16.4 |
| 2,734,519 | 2/1956 | Widdowson | 187—18 XR |

FOREIGN PATENTS

| | | |
|---|---|---|
| 1,211,725 | 10/1959 | France. |

GERALD M. FORLENZA, Primary Examiner

F. E. WERNER, Assistant Examiner

U.S. Cl. X.R.

187—18; 193—38; 214—16.4